US008311829B2

(12) United States Patent
Longé et al.

(10) Patent No.: US 8,311,829 B2
(45) Date of Patent: *Nov. 13, 2012

(54) MULTIMODAL DISAMBIGUATION OF SPEECH RECOGNITION

(75) Inventors: Michael Longé, Seattle, WA (US);
Richard Eyraud, Seattle, WA (US);
Keith C. Hullfish, Snohomish, WA (US)

(73) Assignee: Tegic Communications, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/312,799

(22) Filed: Dec. 6, 2011

(65) Prior Publication Data

US 2012/0143607 A1 Jun. 7, 2012

Related U.S. Application Data

(63) Continuation of application No. 12/830,227, filed on Jul. 2, 2010, now Pat. No. 8,095,364, which is a continuation of application No. 11/143,409, filed on Jun. 1, 2005, now Pat. No. 7,881,936.

(60) Provisional application No. 60/576,732, filed on Jun. 2, 2004, provisional application No. 60/651,302, filed on Feb. 8, 2005.

(51) Int. Cl.
*G10L 15/00* (2006.01)
*G10L 15/18* (2006.01)

(52) U.S. Cl. ........................................ 704/257; 704/235

(58) Field of Classification Search .................. 704/235, 704/251, 257, 270
See application file for complete search history.

(56) References Cited

U.S. PATENT DOCUMENTS

| RE32,773 | E | 10/1988 | Goldwasser et al. |
|---|---|---|---|
| 5,288,158 | A | 2/1994 | Matias |
| 5,960,385 | A | 9/1999 | Skiena et al. |
| 5,963,671 | A | 10/1999 | Comerford et al. |
| 5,999,950 | A | 12/1999 | Krueger et al. |
| 6,005,498 | A | 12/1999 | Yang et al. |

(Continued)

FOREIGN PATENT DOCUMENTS

EP 0319193 A2 6/1989

(Continued)

OTHER PUBLICATIONS

"America Online, Inc. Acquires Tegic Communications", www.tegic.com/pressreleases/pr_aolacquisition.html, Press Release from Tegic Communications, Dec. 1, 1999, 1-3.

(Continued)

*Primary Examiner* — Angela A Armstrong
(74) *Attorney, Agent, or Firm* — Michael A. Glenn; Glenn Patent Group

(57) ABSTRACT

The present invention provides a speech recognition system combined with one or more alternate input modalities to ensure efficient and accurate text input. The speech recognition system achieves less than perfect accuracy due to limited processing power, environmental noise, and/or natural variations in speaking style. The alternate input modalities use disambiguation or recognition engines to compensate for reduced keyboards, sloppy input, and/or natural variations in writing style. The ambiguity remaining in the speech recognition process is mostly orthogonal to the ambiguity inherent in the alternate input modality, such that the combination of the two modalities resolves the recognition errors efficiently and accurately. The invention is especially well suited for mobile devices with limited space for keyboards or touch-screen input.

8 Claims, 4 Drawing Sheets

U.S. PATENT DOCUMENTS

| | | |
|---|---|---|
| 6,009,444 A | 12/1999 | Chen |
| 6,011,554 A | 1/2000 | King et al. |
| 6,041,323 A | 3/2000 | Kubota |
| 6,044,347 A | 3/2000 | Abella et al. |
| 6,054,941 A | 4/2000 | Chen |
| 6,073,101 A | 6/2000 | Maes |
| 6,098,086 A | 8/2000 | Krueger et al. |
| 6,104,317 A | 8/2000 | Panagrossi |
| 6,120,297 A | 9/2000 | Morse, III et al. |
| 6,130,628 A | 10/2000 | Schneider-hufschmidt et al. |
| 6,169,538 B1 | 1/2001 | Nowlan et al. |
| 6,172,625 B1 | 1/2001 | Jin et al. |
| 6,178,401 B1 | 1/2001 | Franz et al. |
| 6,204,848 B1 | 3/2001 | Nowlan et al. |
| 6,208,966 B1 | 3/2001 | Bulfer |
| 6,219,731 B1 | 4/2001 | Gutowitz |
| 6,223,059 B1 | 4/2001 | Haestrup |
| 6,286,064 B1 | 9/2001 | King et al. |
| 6,304,844 B1 | 10/2001 | Pan et al. |
| 6,307,548 B1 | 10/2001 | Flinchem et al. |
| 6,307,549 B1 | 10/2001 | King et al. |
| 6,346,894 B1 | 2/2002 | Connolly et al. |
| 6,362,752 B1 | 3/2002 | Guo et al. |
| 6,363,347 B1 | 3/2002 | Rozak |
| 6,377,965 B1 | 4/2002 | Hachamovitch et al. |
| 6,392,640 B1 | 5/2002 | Will |
| 6,421,672 B1 | 7/2002 | Mcallister et al. |
| 6,424,743 B1 | 7/2002 | Ebrahimi |
| 6,466,232 B1 | 10/2002 | Newell et al. |
| 6,502,118 B1 | 12/2002 | Chatterjee |
| 6,542,170 B1 | 4/2003 | Williams et al. |
| 6,559,778 B1 | 5/2003 | Hillmering |
| 6,567,075 B1 | 5/2003 | Baker et al. |
| 6,574,597 B1 | 6/2003 | Mohri et al. |
| 6,584,179 B1 | 6/2003 | Fortier et al. |
| 6,633,846 B1 | 10/2003 | Bennett et al. |
| 6,636,162 B1 | 10/2003 | Kushler et al. |
| 6,646,573 B1 | 11/2003 | Kushler et al. |
| 6,684,185 B1 | 1/2004 | Junqua et al. |
| 6,686,852 B1 | 2/2004 | Guo |
| 6,711,290 B2 | 3/2004 | Sparr et al. |
| 6,728,348 B2 | 4/2004 | Denenberg et al. |
| 6,734,881 B1 | 5/2004 | Will |
| 6,738,952 B1 | 5/2004 | Yamamuro |
| 6,751,605 B2 | 6/2004 | Gunji et al. |
| 6,757,544 B2 | 6/2004 | Rangarajan et al. |
| 6,801,190 B1 | 10/2004 | Robinson et al. |
| 6,801,659 B1 | 10/2004 | O'Dell |
| 6,807,529 B2 | 10/2004 | Johnson et al. |
| 6,864,809 B2 | 3/2005 | O'Dell et al. |
| 6,912,581 B2 | 6/2005 | Johnson et al. |
| 6,934,564 B2 | 8/2005 | Laukkanen et al. |
| 6,947,771 B2 | 9/2005 | Guo et al. |
| 6,955,602 B2 | 10/2005 | Williams |
| 6,956,968 B1 | 10/2005 | O'Dell et al. |
| 6,973,332 B2 | 12/2005 | Mirkin et al. |
| 6,982,658 B2 | 1/2006 | Guo |
| 6,985,933 B1 | 1/2006 | Singhal et al. |
| 7,006,820 B1 | 2/2006 | Parker et al. |
| 7,013,258 B1 | 3/2006 | Su et al. |
| 7,020,849 B1 | 3/2006 | Chen |
| 7,027,976 B1 | 4/2006 | Sites |
| 7,057,607 B2 | 6/2006 | Mayoraz et al. |
| 7,061,403 B2 | 6/2006 | Fux |
| 7,075,520 B2 | 7/2006 | Williams |
| 7,095,403 B2 | 8/2006 | Lyustin et al. |
| 7,098,896 B2 | 8/2006 | Kushler et al. |
| 7,139,430 B2 | 11/2006 | Sparr et al. |
| 7,152,213 B2 | 12/2006 | Pu et al. |
| 7,224,292 B2 | 5/2007 | Lazaridis et al. |
| 7,256,769 B2 | 8/2007 | Pun et al. |
| 7,257,528 B1 | 8/2007 | Ritchie et al. |
| 7,272,564 B2 | 9/2007 | Phillips et al. |
| 7,313,277 B2 | 12/2007 | Morwing et al. |
| 7,349,576 B2 | 3/2008 | Holtsberg |
| 7,386,454 B2 | 6/2008 | Gopinath et al. |
| 7,389,235 B2 | 6/2008 | Dvorak |
| 7,395,203 B2 | 7/2008 | He |
| 7,437,001 B2 | 10/2008 | Morwing et al. |
| 7,466,859 B2 | 12/2008 | Chang et al. |
| 7,881,936 B2 * | 2/2011 | Longe et al. ............... 704/257 |
| 8,095,364 B2 * | 1/2012 | Longe et al. ............... 704/257 |
| 2002/0038207 A1 | 3/2002 | Mori et al. |
| 2002/0072395 A1 | 6/2002 | Miramontes |
| 2002/0119788 A1 | 8/2002 | Parupudi et al. |
| 2002/0135499 A1 | 9/2002 | Guo |
| 2002/0145587 A1 | 10/2002 | Watanabe |
| 2002/0152075 A1 | 10/2002 | Kung et al. |
| 2002/0188448 A1 | 12/2002 | Goodman et al. |
| 2003/0011574 A1 | 1/2003 | Goodman |
| 2003/0023420 A1 | 1/2003 | Goodman |
| 2003/0023426 A1 | 1/2003 | Pun et al. |
| 2003/0054830 A1 | 3/2003 | Williams et al. |
| 2003/0078038 A1 | 4/2003 | Kurosawa et al. |
| 2003/0095102 A1 | 5/2003 | Kraft et al. |
| 2003/0104839 A1 | 6/2003 | Kraft et al. |
| 2003/0119561 A1 | 6/2003 | Hatch et al. |
| 2003/0144830 A1 | 7/2003 | Williams |
| 2003/0179930 A1 | 9/2003 | O'Dell et al. |
| 2003/0193478 A1 | 10/2003 | Ng et al. |
| 2004/0049388 A1 | 3/2004 | Roth et al. |
| 2004/0067762 A1 | 4/2004 | Balle |
| 2004/0127197 A1 | 7/2004 | Roskind |
| 2004/0127198 A1 | 7/2004 | Roskind et al. |
| 2004/0135774 A1 | 7/2004 | La Monica |
| 2004/0153963 A1 | 8/2004 | Simpson et al. |
| 2004/0153975 A1 | 8/2004 | Williams et al. |
| 2004/0155869 A1 | 8/2004 | Robinson et al. |
| 2004/0163032 A1 | 8/2004 | Guo et al. |
| 2004/0169635 A1 | 9/2004 | Ghassabian |
| 2004/0201607 A1 | 10/2004 | Mulvey et al. |
| 2004/0203656 A1 | 10/2004 | Andrew et al. |
| 2004/0259598 A1 | 12/2004 | Wagner et al. |
| 2005/0017954 A1 | 1/2005 | Kay et al. |
| 2005/0114770 A1 | 5/2005 | Sacher et al. |
| 2006/0010206 A1 | 1/2006 | Apacible et al. |
| 2006/0129928 A1 | 6/2006 | Qiu |
| 2006/0136408 A1 | 6/2006 | Weir et al. |
| 2006/0155536 A1 | 7/2006 | Williams et al. |
| 2006/0158436 A1 | 7/2006 | LaPointe et al. |
| 2006/0173807 A1 | 8/2006 | Weir et al. |
| 2006/0190822 A1 | 8/2006 | Basson et al. |
| 2006/0193519 A1 | 8/2006 | Sternby |
| 2006/0236239 A1 | 10/2006 | Simpson et al. |
| 2006/0239560 A1 | 10/2006 | Sternby |
| 2007/0094718 A1 | 4/2007 | Simpson |
| 2007/0203879 A1 | 8/2007 | Templeton-Steadman et al. |
| 2007/0276814 A1 | 11/2007 | Williams |
| 2007/0285397 A1 | 12/2007 | LaPointe et al. |
| 2008/0130996 A1 | 6/2008 | Sternby |

FOREIGN PATENT DOCUMENTS

| | | |
|---|---|---|
| EP | 0464726 A2 | 1/1992 |
| EP | 0660216 A1 | 12/1994 |
| EP | 0651315 A1 | 5/1995 |
| EP | 0732646 A2 | 9/1996 |
| EP | 0751469 A1 | 1/1997 |
| EP | 0313975 A2 | 5/1998 |
| EP | 1031913 A2 | 8/2000 |
| EP | 1035712 A2 | 9/2000 |
| EP | 1296216 A1 | 3/2003 |
| EP | 1320023 A2 | 6/2003 |
| EP | 1324573 A2 | 7/2003 |
| EP | 1347361 A1 | 9/2003 |
| EP | 1347362 A1 | 9/2003 |
| GB | 2298166 | 8/1996 |
| GB | 2383459 | 6/2003 |
| JP | 8006939 | 1/1996 |
| WO | WO-8200442 | 2/1982 |
| WO | WO 9001749 | 6/1990 |
| WO | WO-03058420 | 7/2003 |
| WO | WO-2004/111812 A2 | 12/2004 |
| WO | WO-2004/111871 A1 | 12/2004 |
| WO | WO-2006/026908 A1 | 3/2006 |

OTHER PUBLICATIONS

"U.S. Appl. No. 12/830,227 Non-Final Office Action mailed Jul. 12, 2011", 19.

"http://pitecan.com/OpenPOBoxlinfo/index.html", Jul. 23, 2001.

"Latest Philips Wireless Handset Ships With T9 Text Input in China", Business Wire, www.businesswire.com/webbox/bw.110999/193130342.htm, Nov. 9, 1999, Total of 2 pages.

"Making Multi-tap Intelligent", http://www.zicorp.com/ezitap.htm, retrieved Feb. 7, 2006, 2005, Total of 1 page.

"Motorola Lexicus Technologies & SOK's iTAP page", www.motorola.com/lexicus/html/itap_FAQ.html, retrieved Sep. 6, 2002, 2002, Total of 1 page.

"Speed Keyboard for Data Processor", IBM Technical Disclosure Bulletin, vol. 23, Jul. 1980, Total of 3 pages.

"Tapless ppd Gen3.0", http://www.tapless.biz, retrieved from website Feb. 7, 2006, 2006, Total of 1 page.

"Welcome to the Nuance Corporate Website", http://www.nuance.com/, Retrieved on Feb. 7, 2006 from website, 2006, Total of 2 pages.

"What is writing?", http://vvww.ling.upenn.edu/courses/Fall_2003/ling001/reading_writing.html, Linguistics 001. Lecture 19, Reading and Writing, 2003, Total of 13 pages.

"WordLogic for Handheld Computers", Retrieved from webarchive.org, http://web.archive.org/web/20051030092534/www.wordlogic.com/products-predictive-keyboard-handheld-prediction.asp, Oct. 30, 2005, Total of 1 page.

"Zi Claims Second Patent Victory Against Tegic Communications, a unit of AOL Time Warner", www.zicorp.com/pressreleases/031402.html, News Release from Zi Corporation, Mar. 14, 2002, 1-2.

"Zi Corporation, Inc. v. Tegic Communications, Inc.", www.zicorp.com/pressreleases/031402.html, Summary Judgment Orders, Mar. 13, 2002, 1-7.

Arnott, John, "Probabilistic Character Disambiguation for Reduced Keyboards Using Small Text Samples", AAC Augmentative and Alternative Communication, vol. 8, No. 3, Dept. Math & comp. Sci.; Univ of Dundee, Dundee, Tayside, Scotland, Sep. 1992, 215-223.

Butts, L., "An Evaluation of Mobile Phone Text Input Methods", Conferences in Research and Practice in Information Technology, Cockburn, A. (Additional Author), vol. 7, University of Canterbury, Dept of Computer Science, Christchurch, New Zealand AUIC2002, Melbourne Australia, Australian Computer Society, 2001, Total of 6 pages.

Cockburn, A., "Evaluating Mobile Text Entry with Fastap™ Keyboard", People and Computers XVII (vol. 2): British Computer Society Conference on Human Computer Interaction, Siresena (Additional Author), Bath, England, 2003, 77-820.

Coppola, P. et al., "Mobe: a framework for context-aware mobile applications", In: Proc. Of Workshop on Context Awareness for Proactive Systems, Helsinki University Press, ISBN:952-10-2518-2, 2005, 55-65.

Defrancis, John, "The Ideographic Myth", The Chinese Language: Face and Fantasy, University of Hawi'i Press, Link to chapter: http://www.pinyin.info/readings/texts/ideographic_myth.html, 1984, Total of 13 pages.

Demasco, Patrick W. et al., "Generating Text From Compressed Input: An Intelligent Interface for People with Sever Motor Impairments", Communications of the ACM, vol. 35 No. 5, May 1992, 68-78.

Dey, A.K., "Towards a better understanding of context and context-awareness", GVU Technical Report, Abowd, G. D. (Additional Author), GVU Center, GIT-GVU-99-2, Atlanta GA, USA, 1999, Total of 12 pages.

Foulds, Richard et al., "Lexical Prediction Techniques Applied to Reduce Motor Requirements for Augmentative Communication", RESNA 10th Annual Conference, San Jose, California, 1987, 115-117.

Foulds, Richard et al., "Statistical Disambiguation of Multi-Character Keys Applied to Reduce Motor Requirements for Augmentative and Alternative Communication", AAC Augmentative and Alternative Communication, 1987, 192-195.

Gavalda, M., "Epiphenomenal Grammar Acquisition with GSG", Proceedings of the Workshop on Conversational Systems of the 6th Conf. on Applied Natural Language Processing and the 1st Conf. of the N. American Chapter of the Assoc. for Computational Linguistics, Seattle, Washington, (ANLP/NAACL-2000), May 2000, Total of 6 pages.

James, Christina et al., "Bringing Text Input Beyond the Desktop", CHI 2000, Seattle, WA, Apr. 1-6, 2000, Apr. 2000, 49-50.

James, Christina L. et al., "Text Input for Mobile Devices: Comparing Model Prediction to Actual Performance", SIGCHI '01, Seattle, WA, Mar. 31-Apr. 4, 2001, ACM 1-58113-327-8/01/0003, 2001, 365-371.

Kamphuis, Harry et al., "Katdas; A Small Number of Keys Direct Access System", RESNA 12th Annual Conference, New Orleans, Louisiana, 1989, 278-279.

King, Martin T. et al., "JustType-Efficient Communication with Eight Keys", Proceedings of the RESNA '95 Annual Conference, Vancouver, BC, Canada, 1995, Total of 3 pages.

Kreifeldt, J.G. et al., "Reduced Keyboard Designs Using Disambiguation", Proceedings of the Human Factors Society 33rd Annual Meeting, 1989, 441-444.

Kronlid, F et al., "TreePredict, Improving Text Entry on PDA's", Proceedings of the Conference on Human Factors in Computing Systems, CHI2001, ACM press, 2001, 441-442.

Kushler, Cliff, "AAC Using a Reduced Keyboard", www.dinf.ne.jp/doc/english/Us_Eu/conf/csun_98/csun98_140.htm, CSUN 98 Papers, Web Posted Mar. 3, 1998, 1998, Total of 4 pages.

Lesher, Gregory W. et al., "Optimal Character Arrangements for Ambiguous Keyboards", IEEE Transactions on Rehabilitation Engineering, vol. 6, No. 4, Dec. 1998, 415-423.

Levine, Stephen H. et al., "Adaptive Technique for Customized Interface Design With Application to Nonvocal Communication", RESNA 9th Annual Conference, Minneapolis, Minnesota, 1986, 399-401.

Levine, Stephen H., "An Adaptive Approach to Optimal Keyboard Design for Nonvocal Communication", IEEE, 1985, 334-337.

Levine, Stephen H. et al., "Computer Disambiguation of Multi-Character Key Text Entry: An Adaptive Design Approach", IEEE, 1986, 298-301.

Levine, Stephen H. et al., "Multi-Character Key Text Entry Using Computer Disambiguation", RESNA 10th Annual Conference, San Jose, California, 1987, 177-178.

MacKenzie, et al., "Text Entry for Mobile Computing: Models and Methods, Theory and Practice", www.yorku.ca/mack/hci3.html, Retrieved Sep. 6, 2002, 2002, Total of 26 pages.

MacKenzie, I. Scott et al., "LetterWise: Prefix-based Disambiguation for Mobile Text Input", UIST '01, Orlando, FL, Nov. 11-14, 2001, ACM 1-58113-438-x/01/11, 2001, 111-120.

Martin, T. et al., "Learning User Models for an Intelligent Telephone Assistant", Proceedings Joint 9th IFSA World Congress and 20th NAFIPS Intnl. Conf., IEEE, vol. 2, Piscataway, NJ, USA, Cat. No. 01TH8569, 2001, 669-674.

Masui, T., "POBox: An Efficient Text Input Method for Handheld and Ubiquitous Computers", Sony Computer Science Laboratories, Apr. 1998, Total of 12 pages.

Matias, Edgar, "Half-QWERTY: Typing With One Hand Using Your Two-Handed Skills", Conference Companion, CHI '94, Apr. 24-28, 1994, Apr. 1994, 51-52.

Minneman, Scott L., "A Simplified Touch-Tone Telecommunication Aid for Deaf and Hearing Impaired Individuals", RESNA 8th Annual Conference, Memphis Tennessee, 209-211, 1985.

Oommen, B. John et al., "String Taxonomy Using Learning Automata", IEEE Transactions on Systems, Mand and Cybernetics—Part B: Cybernetics, vol. 27 No. 20, Apr. 1997, 354-365.

Oommen, B.J. et al., "Correction to 'An Adaptive Learning Solution to the Keyboard Optimization Problem'", IEEE Transactions on Systems, Man and Cybernetics, vol. 22, No. 5, Oct. 1992, 1233-1243.

Oviatt, Sharon, "Mutual Disambiguation of Recognition Errors in a Multimodal Architecture", Chi 99, May 15-29, 1999, 576-583.

Rosa, J., "A Biologically Motivated Connectionist System for Predicting the Next Word in Natural Language Sentence", IEEEE Intnl Conference on Systems, man and Cybernetics; Conf. Proceedings, Cat. No. 02CH37349, Part vol. 4, p. 6, Yasmine Hammamet, Tunisia, 2002, Total of 2 pages.

Rosa, J., "Next Word Prediction in a Connectional Distributed Representation System", IEEEE Intnl Conference on Systems, man and Cybernetics; Conf. Proceedings, Cat. No. 02CH37349, Part vol. 3, p. 6, Yasmine Hammamet, Tunisia, 2002, Total of 2 pages.

Schmidt, A. et al., "Advanced Interaction in Context", In Proceedings of First International Symposium of Handheld and Ubiquitous Computing, Karlsruhe, Germany, Sep. 1999, 89-101.

Shieber, S., "Abbreviated Text Input", Abbreviated Text Input, Baker, E. (Additional Author), Harvard University, Cambridge, MA, USA shieber@deas.harvard.edu, ellie@eecs.harvard.edu, ACM 1-58113-586-6/03/0001, 2003, 293-296.

Siewiorek, D.P. et al., "SenSay: A context-aware mobile phone", In proceedings of the 7th International Symposium on Wearable Computers, IEEE Press, 2003, 248-249.

Silfverberg, Miika et al., "Predicting Text Entry Speed on Mobile Phones", CHI 2000, The Hague, Amsterdam, Apr. 1-6, 2000, ACM 1-58113-216-6/00/04, Apr. 2000, 9-16.

Smith, Sidney L. et al., "Alphabetic Data Entry Via the Touch-Tone Pad: A Comment", Human Factors, vol. 13 No. 2, Apr. 1971, 189-190.

Sugimoto, Masakatsu et al., "SHK: Single Hand Key Card for Mobile Devices", CHI 1996, Apr. 13-18, 1996, Apr. 1996, 7-8.

Sugimoto, Masakatsu, "Single-Hand Input Scheme for English and Japanese Text", Fujitsu Sci. Tech.J., vol. 33 No. 2, Dec. 1997, 189-195.

Suhm, B. et al., "Multimodal Error Correction for Speech User Interfaces", ACM Transactions on Computer-Human Interaction, vol. 8, Mar. 2001, 60-98.

Swiffin, Andrew L. et al., "Adaptive and Predictive Techniques in a Communications Prosthesis", AAC Augmentative and Alternative Communication, 1987, 181-191.

Swiffin, Andrew L. et al., "PAL: An Effort Efficient Portable Communication Aid and Keyboard Emulator", RESNA 8th Annual Conference, Memphis, Tennessee, 1985, 197 & 199.

Tygran, Amalyan, "T9 or Text Predicative Input in Mobile Telephones", Business Wire, web.archive.org/wweb/20010723054055/http://www.digit-life.com/articles/mobilet9/, Jul. 23, 2001, 1-5.

Witten, I.H., "Principles of Computer Speech", New York: Academic Press, 1982, 246-253.

Xu, Jinxi et al., "Corpus-Based Stemming Using Cooccurrence of Word Variants", CM Transactions on Information Systems, vol. 16 No. 1, ACM 1046-8188/98/0100-0061, Jan. 1989, 61-81.

Yang, Y et al., "A Comparative Study on Feature Selection in Text Categorization", Proceedings of ICML 1997, 1997, 412-420.

Zernik, U., "Language Acquisition: Coping with Lexical Gaps", Proceedings of the 12th International Conference on Computational Linguistics, Budapest, Hungary, 1998, 796-800.

* cited by examiner

MULTIMODAL DISAMBIGUATION OF SPEECH RECOGNITION

CROSS REFERENCE TO RELATED APPLICATIONS

This application is a continuation of U.S. patent application Ser. No. 12/830,227, filed Jul. 2, 2010 now U.S. Pat. No. 8,095,364, which is a continuation of U.S. patent application Ser. No. 11/143,409, now U.S. Pat. No. 7,881,936, filed Jun. 1, 2005 in the names of Longe et al. The '409 application claimed priority from U.S. provisional patent application Ser. No. 60/576,732, filed Jun. 2, 2004, U.S. provisional patent application Ser. No. 60/651,302, filed Feb. 8, 2005 and U.S. patent application Ser. No. 10/866,634, filed Jun. 10, 2004, now U.S. Pat. No. 7,679,534 and U.S. patent application Ser. No. 11/043,506 filed Jan. 25, 2005, now U.S. Pat. No. 7,319,957. All of the foregoing documents are hereby incorporated herein in their entirety.

BACKGROUND OF THE INVENTION

1. Technical Field

The invention relates to user entry of information into a system with an input device. More particularly, the invention relates to speech recognition combined with disambiguating systems for text input.

2. Description of the Prior Art

For many years, portable computers have been getting smaller and smaller. The principal size-limiting component in the effort to produce a smaller portable computer has been the keyboard. If standard typewriter-size keys are used, the portable computer must be at least as large as the standard keyboard. Miniature keyboards have been used on portable computers, but the miniature keyboard keys have been found to be too small to be manipulated easily or quickly by a user. Incorporating a full-size keyboard in a portable computer also hinders true portable use of the computer. Most portable computers cannot be operated without placing the computer on a flat work surface to allow the user to type with both hands. A user cannot easily use a portable computer while standing or moving.

Presently, a tremendous growth in the wireless industry has spawned reliable, convenient, and very popular mobile devices available to the average consumer, such as cell phones, PDAs, etc. Thus, handheld wireless communications and computing devices requiring text input are becoming smaller still. Recent advances in cellular telephones and other portable wireless technologies have led to a demand for small and portable two-way messaging systems. Most wireless communications device manufacturers also desire to provide to consumers devices that can be operated by a user with the same hand that is holding the device.

Speech recognition has long been expected to be the best means for text input, both as an enhancement to productivity on the desktop computer and as a solution for the size limitations of mobile devices. A speech recognition system typically includes a microphone to detect and record the voice input. The voice input is digitized and analyzed to extract a speech pattern. Speech recognition typically requires a powerful system to process the voice input. Some speech recognition systems with limited capability have been implemented on small devices, such as command and control on cellular phones, but for voice-controlled operations a device only needs to recognize a few commands. Even for such a limited scope of speech recognition, a small device may not have satisfactory speech recognition accuracy because voice patterns vary dramatically across speakers and environmental noise adds complexity to the signal.

Suhm et al discuss a particular problem of speech recognition in the paper Multimodal Error Correction for Speech User Interfaces, in ACM Transactions on Computer-Human Interaction (2001). The "repair problem" is that of correcting the errors that occur due to imperfect recognition. They found that using the same modality (re-speaking) was unlikely to correct the recognition error, due in large part to the "Lombard" effect where people speak differently than usual after they are initially misunderstood, and that using a different modality, such as a keyboard, was a much more effective and efficient remedy. Unfortunately, mobile devices in particular lack the processing power and memory to offer full speech recognition capabilities, resulting in even higher recognition errors, and lack the physical space to offer full keyboard and mouse input for efficiently correcting the errors.

Disambiguation

Prior development work has considered use of a keyboard that has a reduced number of keys. As suggested by the keypad layout of a touch-tone telephone, many of the reduced keyboards have used a 3-by-4 array of keys. Each key in the array of keys contains multiple characters. There is therefore ambiguity as a user enters a sequence of keys because each keystroke may indicate one of several letters. Several approaches have been suggested for resolving the ambiguity of the keystroke sequence. Such approaches are referred to as disambiguation.

Some suggested approaches for determining the correct character sequence that corresponds to an ambiguous keystroke sequence are summarized by J. Arnott, M. Javad in their paper Probabilistic Character Disambiguation for Reduced Keyboards Using Small Text Samples, in the Journal of the International Society for Augmentative and Alternative Communication.

T9® Text Input is the leading commercial product offering word-level disambiguation for reduced keyboards such as telephone keypads, based on U.S. Pat. No. 5,818,437 and subsequent patents. Ordering the ambiguous words by frequency of use reduces the efficiency problems identified in earlier research, and the ability to add new words makes it even easier to use over time. Input sequences may be interpreted simultaneously as words, word stems and/or completions, numbers, and unambiguous character strings based on stylus tap location or keying patterns such as multi-tap.

T9 and similar products are also available on reduced keyboard devices for languages with ideographic rather than alphabetic characters, such as Chinese. These products typically take one of two approaches: basic handwritten strokes or stroke categories are mapped to the available keys, and the user enters the strokes for the desired character in a traditional order; or a phonetic alphabet is mapped to the keys and the user enters the phonetic spelling of the desired character. In either case, the user then has to locate and select the desired character among the many that match the input sequence. The input products often benefit from the context of the previously entered character to improve the ordering of the most likely characters displayed, as two or more ideographic characters are often needed to define a word or phrase.

Unfortunately, mobile phones are being designed with ever-smaller keypads, with keys that are more stylish but also more difficult for typing quickly and accurately. And disambiguating ambiguous keystroke sequences could benefit from further improvements. For example, the syntactic or application context is not typically taken into account when disambiguating an entered sequence or when predicting the next one.

Another commonly used keyboard for small devices consists of a touch-sensitive panel on which some type of keyboard overlay has been printed, or a touch-sensitive screen with a keyboard overlay displayed. Depending on the size and nature of the specific keyboard, either a finger or a stylus can be used to interact with the panel or display screen in the area associated with the key or letter that the user intends to activate. Due to the reduced size of many portable devices, a stylus is often used to attain sufficient accuracy in activating each intended key. The small overall size of such keyboards results in a small area being associated with each key so that it becomes quite difficult for the average user to type quickly with sufficient accuracy.

A number of built-in and add-on products offer word prediction for touch-screen keyboards like those just mentioned. After the user carefully taps on the first letters of a word, the prediction system displays a list of the most likely complete words that start with those letters. If there are too many choices, however, the user has to keep typing until the desired word appears or the user finishes the word. Switching visual focus between the touch-screen keyboard and the list of word completions after every letter tends to slow text entry rather than accelerate it.

The system described in U.S. Pat. No. 6,801,190 uses word-level auto-correction to resolve the accuracy problem and permit rapid entry on small keyboards. Because tap locations are presumed to be inaccurate, there is some ambiguity as to what the user intended to type. The user is presented with one or more interpretations of each keystroke sequence corresponding to a word such that the user can easily select the desired interpretation. This approach enables the system to use the information contained in the entire sequence of keystrokes to resolve what the user's intention was for each character of the sequence. When auto-correction is enabled, however, the system may not be able to offer many word completions since it does not presume that the first letters are accurate, cannot determine whether the user is typing the entire word, and there may be many other interpretations of the key sequence to display.

Handwriting recognition is another approach that has been taken to solve the text input problem on small devices that have a touch-sensitive screen or pad that detects motion of a finger or stylus. Writing on the touch-sensitive panel or display screen generates a stream of data input indicating the contact points. The handwriting recognition software analyzes the geometric characteristics of the stream of data input to determine each character or word.

Unfortunately, current handwriting recognition solutions have many problems:
1) Handwriting is generally slower than typing;
2) On small devices, memory limitations reduce handwriting recognition accuracy; and
3) Individual handwriting styles may differ from those used to train the handwriting software.

It is for these reasons that many handwriting or 'graffiti' products require the user to learn a very specific set of strokes for the individual letters. These specific set of strokes are designed to simplify the geometric pattern recognition process of the system and increase the recognition rate. These strokes may be very different from the natural way in which the letter is written. This results in very low product adoption.

Handwriting on mobile devices introduces further challenges to recognition accuracy: the orientation of handwriting while trying to hold the device may vary or skew the input; and usage while on the move, e.g. the vibration or bumpiness during a bus ride, causes loss of contact with the touch-screen resulting in "noise" in the stream of contact points.

Therefore, current ambiguous and recognizer-based systems for text input, while compensating somewhat for the constraints imposed by small devices, have limitations that reduce their speed and accuracy to a level that users might consider unacceptable.

In Suhm's paper, "multimodal error correction" is defined as using an alternate (non-speech) modality to re-enter the entire word or phrase that was misrecognized. This is found to be more efficient than re-speaking in part because the speech modality has already been shown to be inaccurate. That the alternate input modality has its own recognition accuracy problems is considered by the user in deciding which modality to use next, but each of the modalities are operated independently in an attempt to complete the text entry task.

It would be advantageous to provide an apparatus and method for speech recognition that offers smart editing of speech recognition output.

It would be advantageous to provide an apparatus and method for speech recognition that maximizes the benefits of an alternate input modality in correcting recognition errors.

It would be advantageous to provide an apparatus and method for speech recognition that offers an efficient alternate input modality when speech recognition is not effective or desirable given the current task or environment.

SUMMARY OF THE INVENTION

The present invention provides a speech recognition system combined with one or more alternate input modalities to ensure efficient and accurate text input. The speech recognition system achieves less than perfect accuracy due to limited processing power, environmental noise, and/or natural variations in speaking style. The alternate input modalities use disambiguation or recognition engines to compensate for reduced keyboards, sloppy input, and/or natural variations in writing style. The ambiguity remaining in the speech recognition process is mostly orthogonal to the ambiguity inherent in the alternate input modality, such that the combination of the two modalities resolves the recognition errors efficiently and accurately. The invention is especially well suited for mobile devices with limited space for keyboards or touch-screen input.

One embodiment of the invention provides a method for processing language input in a data processing system that comprises the steps of receiving a first input comprising voice input; determining a first plurality of word candidates according to the first input; receiving a second input comprising a non-voice input; and determining one or more word candidates according to the first input and the second input. The one or more word candidates are determined based on the second input under constraint of the first input. Alternately, the union or intersection of the two word candidate lists is determined, rather than one input filtering the other.

In another embodiment, the one or more word candidates are determined based on the first input in view of word context. The word context is based any of a N-gram language model and a language model of a speech recognition engine.

In another embodiment, the determining of the one or more word candidates comprises the step of correcting or filtering the first plurality of word candidates based on the second input.

In another embodiment, the second input is received on a mobile device; and speech recognition on the voice input is partially performed on the mobile device and partially performed on a server coupled to the mobile device through a wireless communication connection.

In a further embodiment, the speech recognition is activated by a push-to-talk button on the mobile device.

In a further embodiment, the second input is received while one or more of the word candidates is presented for selection or editing.

In a further embodiment, the second input comprises any of a touch screen keyboard, handwriting gesture recognition, and a keypad input.

One embodiment of the invention provides a machine readable medium having instructions stored therein which, when executed on a data processing system, cause the data processing system to perform a method for processing language input, the method comprising the steps of: receiving a first input comprising a voice input; determining a first plurality of word candidates according to the first input; receiving a second input comprising a non-voice input; and determining one or more word candidates according to the first input and the second input.

In another embodiment, the one or more word candidates are determined based on the second input under constraint of the first input, and in view of word context; and the word context is based any of a N-gram language model and a language model of a speech recognition engine.

In another embodiment, the step of determining of the one or more word candidates comprises the step of correcting a list of the first plurality of word candidates.

In yet another embodiment, the second input is received on a client computing device; speech recognition on the voice input is partially performed on the device and partially performed on a server coupled to the device through a data connection; and the speech recognition is activated by a push-to-talk button on the device.

In a further embodiment, the second input is received while one of the first plurality of the word candidates is presented for editing or while the first plurality of the word candidates is presented for selection; and the second input comprises any of a touch screen keyboard; handwriting gesture recognition and a keypad input.

One embodiment of the invention provides a mobile device for processing language input that comprises a speech recognition module to process a first input comprising a voice input; and one or more modules to process a second input comprising a non-voice input; a processing module coupled to the one or more input modules and the speech recognition module, the processing module to determine a first plurality of word candidates according to the first input and subsequently to determine one or more word candidates according to the first input and the second input.

In another embodiment, the one or more word candidates are determined based on a second input under constraint of the first input and in view of word context; and the word context is based on any of a N-gram language model and a language model of a speech recognition engine.

In yet another embodiment, the one or more word candidates are determined through correcting a list of the first plurality of word candidates.

In a further embodiment, speech recognition of the voice input is partially performed on the mobile device and partially performed on a server coupled to the mobile device through a wireless communication connection; and the speech recognition is activated by a push-to-talk button on the mobile device.

In a further embodiment, the second input is received while one of the first plurality of the word candidates is presented for editing or while the first plurality of the word candidates is presented for selection, and the second input comprises any of a touch screen keyboard, handwriting gesture recognition, and a keypad input.

In another embodiment, a discrete input mode could be used to speak words representing punctuation. A temporary mode (like T9's Symbols mode) may be invoked to recognize only single characters such as symbols or digits. For instance, saying the word "period" and "." is recognized.

In one embodiment, "Smart" punctuation may be entered during the second input to interpret part of the voice input as punctuation. In another embodiment, there is no need to enter any special mode to recognize punctuation. For example, when a user says "period", both the word "period" and "." could be part of the list.

DETAILED DESCRIPTION OF THE INVENTION

Figure 1:
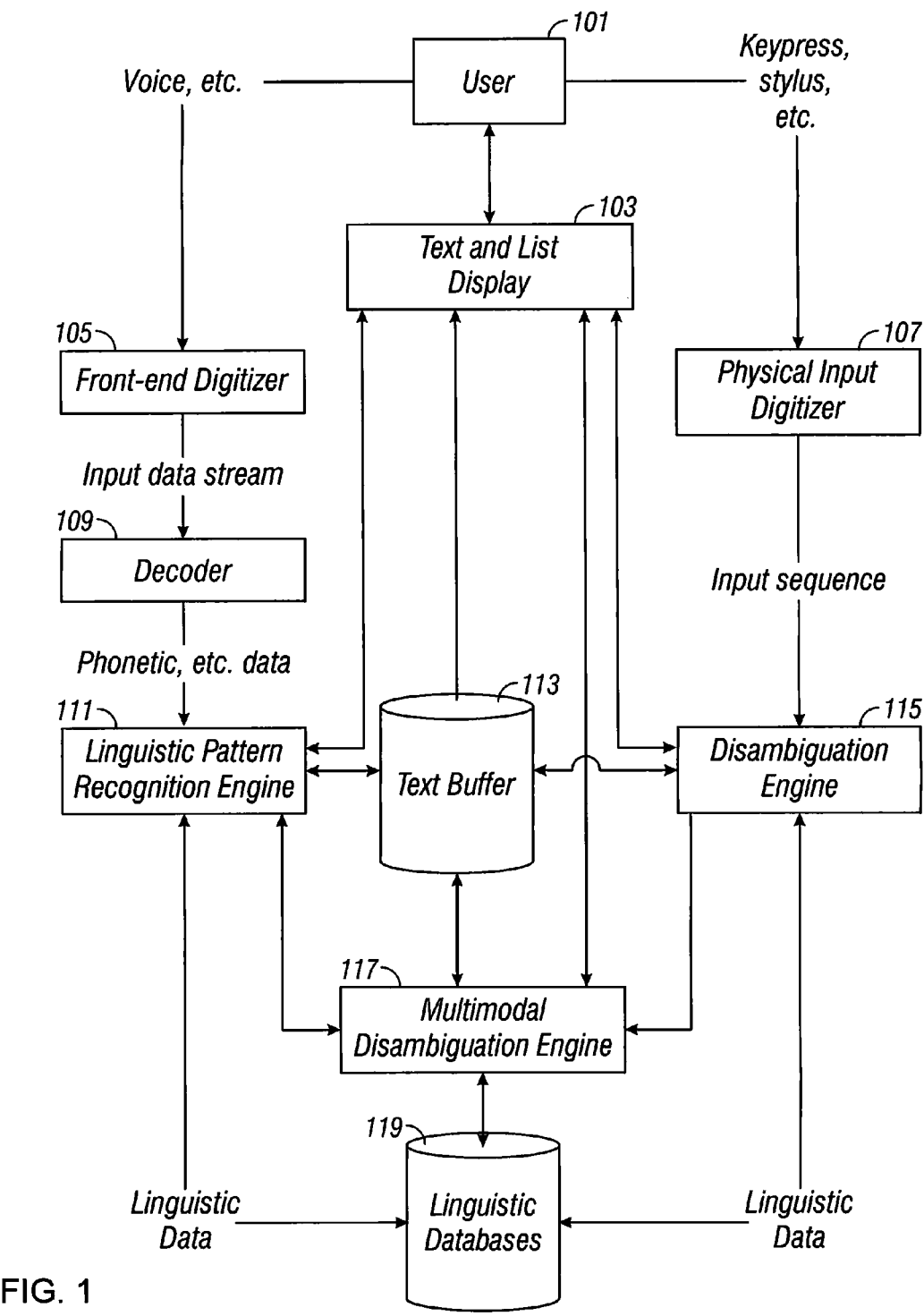
FIG. 1 is a diagram that illustrates a system for recognizing user input on a data processing system according to the invention.

The invention provides an apparatus and method for smart editing of speech recognition output, which offers the most likely choice, or hypothesis, given the user's input. The speech recognition engine scores alternate hypotheses which add value to information provided to the user. For example, if the speech recognition offers the user the wrong first-choice hypothesis, then the user may want to access the other N-best hypotheses to correct what was returned by the recognizer. In a multi-modal environment, the N-best list of hypotheses from the speech recognition output is available. Specifically, the N-best list is incorporated into the current word choice list for easy editing.

One embodiment of the invention makes use of both acoustic information and word context in offering the N-best hypotheses. This could be syntax-dependent or independent. That is, the language model may provide syntactic information that affects the probability of a given word or it may simply provide some type of N-gram model which indicates the probabilities of a particular word following a word or words.

Acoustically similar utterances appear in the N-best list. The information is facilitated by a confusability matrix that informs N-best hypothesis formulation about the frequency of specific phonemic errors. For example, if /p/ is confused with /b/ in word final position by the speech recognition engine, the resulting N-best hypotheses with these phonemes would take this into account. Information may also be available to indicate how frequently each phoneme in a given language is confused with every other phoneme, including positional context, e.g. whether it occurs at the beginning, middle, or end of a word. Information on when phonemes are deleted or inserted may be provided in addition to the confusability information.

In the invention, a user's text input created in this multimodal environment is also used to update any ambiguous or recognition system language databases. Ideally, databases that can be applied to any modality are updated in every modality. If a word offered by the speech recognition engine is not in, for example, the T9 dictionary, it may be added. In addition, word and phrase frequency and N-gram information can also be updated with use.

The invention provides a smart edit feature. For example, a user dictates into the mobile device. The resulting text output from the recognizer is returned to the user wherever the cursor is in the text entry screen. The output is rich in that it is tagged with the N-best information for the purpose of editing and correction.

One embodiment of the invention also provides a client-server feature, whereby the utterances are preprocessed on the device, recognized on a server connected e.g. via an available wireless data channel and returned as N-best lists to the device for text display and editing. Hypotheses are more dynamic and relevant given any changes that the user is making to the text. For example, if the speech recognition engine proposed the word "winner" and the user corrects it with "winter", this action will increase the likelihood that the following word "storm" is accurately recognized if the user's correction is also passed back to the server. Server-side language models provide a more comprehensive morpho-syntactic analysis of the input to improve recognition performance. The models have more power to predict the user's next word, enhancing both word prediction and word completion algorithms. Additionally, language-specific features such as subject-verb agreement, case, gender, and number agreements, etc., can be implemented more easily on a powerful server to increase recognition accuracy. The system may allow the user to control the flow of corrections and updates to the server through client-side configuration or prompting.

The invention also provides "smart" punctuation. Speech recognition systems may have difficulty detecting when a user intends to insert a symbol rather than the word, e.g., "." instead of "period", or ":-)" instead of "smiley". Ambiguous text input systems have a limited number of keys or gestures to select a symbol rather than a letter. But correcting speech with an ambiguous "smart" punctuation feature informs the system that the proper interpretation of the utterance is a symbol.

The invention allows a temporary mode for "push-to-dictate," which is similar to the "push-to-talk" feature except that the speech is converted into text instead of being transmitted as an audio signal to another phone or kept as an audio attachment to an email.

In addition, the invention allows for vector quantization, which can be performed on the device, with the matching/hypothesis lists generated on either the device or the server.

FIG. 1 is a diagram that illustrates a system for recognizing user input on a data processing system according to the invention. The user 101 begins by dictating a word, phrase, sentence, or paragraph. The digitizer 105 and decoder 109 convert the acoustic input, using an acoustic model (not shown), to phonetic data. That data is analyzed by the recognition engine 111, based on the lexicon and/or language model in the linguistic databases 119, optimally including frequency or recency of use, and optionally based on the surrounding context in the text buffer 113. The best interpretation is added to the text buffer 113 and shown to the user 101 via the text and list display 103. Alternately, the N-best list of interpretations is stored in the text buffer 113 for later reference and/or presented to the user 101 for confirmation via the text and list display 103.

At some point afterwards, the user 101 selects a word or phrase for correction via the text and list display 103. Depending on the input capabilities of the alternate modality, the user presses keys or taps or writes on a touch-screen, which is converted to an input sequence by an appropriate digitizer 107. The disambiguation engine 115 determines possible interpretations based on the lexicon and/or language model in the linguistic databases 119, optimally including frequency or recency of use, and optionally based on the surrounding context in the text buffer 113. The multimodal disambiguation engine 117 compares the ambiguous input sequence and/or interpretations against the best or N-best interpretations of the speech recognition and presents revised interpretations to the user 101 for confirmation via the text and list display 103. In an alternate embodiment, the disambiguation engines 115 and 117 are combined, and mutual disambiguation occurs as an inherent part of processing the input from the alternate modality.

In another embodiment, the multimodal disambiguation engine 117 directs the ambiguous interpretations back to the recognition engine 111 for reinterpretation along with the best or N-best list of speech interpretations. In one such embodiment, the original vectors or phoneme tags are stored in the text buffer 113; in another, the multimodal disambiguation engine 117 or recognition engine 111 maps the characters (graphs) of the words in the best or N-best and/or ambiguous interpretations back to vectors or phonemes for reinterpretation by the recognition engine 111.

The recognition and disambiguation engines 111, 115, 117 may update one or more of the linguistic databases 119 to add novel words or phrases that the user 101 has explicitly spelled or compounded, and to reflect the frequency or recency of use of words and phrases entered or corrected by the user 101.

In another embodiment of the invention, the system recognizes handwriting, (whether block, cursive, or even shorthand) instead of speech. The system components 105, 109, 111 serve similar functions for handwriting as they do for speech. The alternate modality may be ambiguous input from a keypad or touch-screen keyboard, or speech recognition (whether continuous, discrete, or by letter), depending on the input capabilities and processing power of the equipment.

Figure 2:
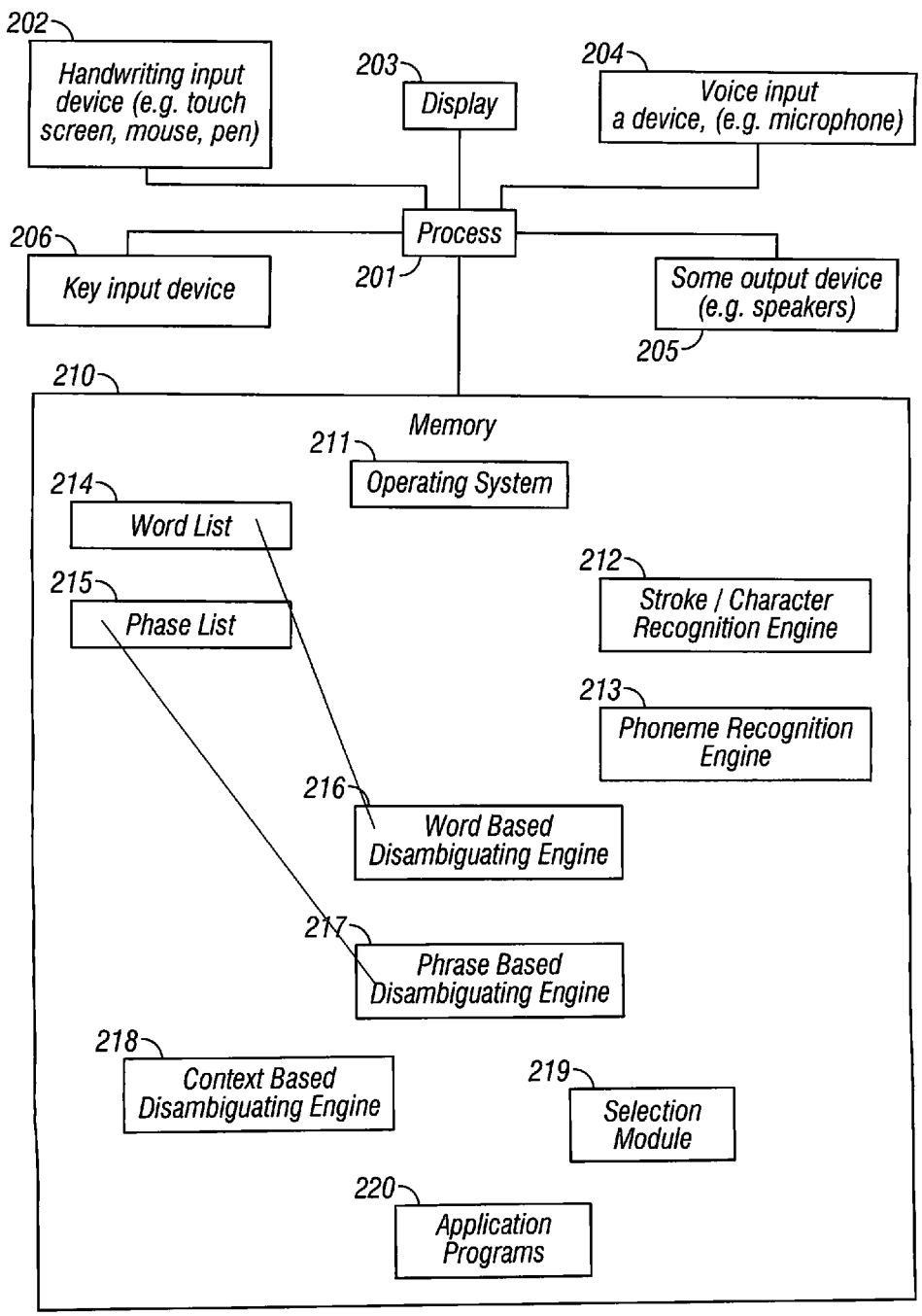
FIG. 2 is block diagram of a data processing system for recognizing user input according to the invention.

FIG. 2 is block diagram of a data processing system for recognizing user input according to the invention. Although FIG. 2 illustrates various components of an example data processing system, it is understood that a data processing system according to the invention in general may include other components than those illustrated in FIG. 2. For example, some systems may have communication circuitry on a cellular phone embodiment. FIG. 2 illustrates various components closely related to at least some features of the invention. For this description, a person skilled in the art would understand that the arrangements of a data processing system according to the invention are not limited to the particular architecture illustrated in FIG. 2.

The display 203 is coupled to the processor 201 through appropriate interfacing circuitry. A handwriting input device 202, such as a touch screen, a mouse, or a digitizing pen, is coupled to the processor 201 to receive user input for handwriting recognition and/or for other user input. A voice input device 204, such as a microphone, is coupled to the processor 201 to receive user input for voice recognition, and/or for other sound input. A key input device 206, such as a phone keypad, a set of dedicated or configurable buttons, or a small keyboard displayed on a touch screen, is coupled to the processor 201 to receive user input for typing and/or for other user input. Optionally, a sound output device 205, such as a speaker, is also coupled to the processor.

The processor 201 receives input from the input devices, e.g. the handwriting input device 202 or the voice input device 204 or the key input device 206, and manages output to the display and speaker. The processor 201 is coupled to a memory 210. The memory comprises a combination of temporary storage media, such as random access memory (RAM), and permanent storage media, such as read-only memory (ROM), floppy disks, hard disks, or CD-ROMs. The memory 210 contains all software routines and data necessary to govern system operation. The memory typically contains an operating system 211 and application programs 220. Examples of application programs include word processors, messaging clients, and foreign language translators. Speech synthesis software may also be provided as part of the data processing system.

In one embodiment of the invention, the memory 210 includes separate modules for each part of the recognition and/or disambiguation process, which may include one or more of a word-based disambiguating engine 216, a phrase-based recognition or disambiguating engine 217, a context-based recognition or disambiguating engine 218, a selection module 219, and others, such as a word list 214 and a phrase list 215. In this embodiment, the context based disambiguating engine applies contextual aspects of the user's actions toward input disambiguation. For example, a vocabulary may be selected based upon selected user location, e.g. whether the user is at work or at home; the time of day, e.g. working hours vs. leisure time; recipient; etc.

In one embodiment of the invention, the majority of the components for recognition and disambiguation are shared among different input modalities, e.g. for speech recognition and for reduced keypad input. The word list 214 comprises a list of known words in a language for all modalities, so that there are no differences in vocabulary between input modalities. The word list 214 may further comprise the information of usage frequencies for the corresponding words in the language. In one embodiment, a word not in the word list 214 for the language is considered to have a zero frequency. Alternatively, an unknown word may be assigned a very small frequency of usage. Using the assumed frequency of usage for the unknown words, the known and unknown words can be processed in a substantially similar fashion. The word list 214 can be used with the word based recognition or disambiguating engine 216 to rank, eliminate, and/or select word candidates determined based on the result of the pattern recognition engine, e.g. the stroke/character recognition engine 212 or the phoneme recognition engine 213, and to predict words for word completion based on a portion of user inputs. Similarly, the phrase list 215 may comprise a list of phrases that includes two or more words, and the usage frequency information, which can be used by the phrase-based recognition or disambiguation engine 217 and can be used to predict words for phrase completion.

Figure 3:
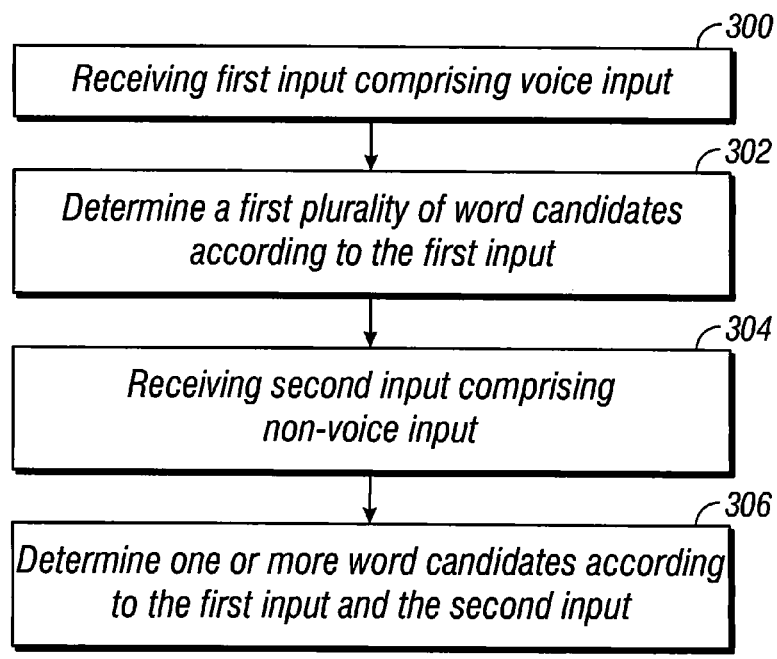
FIG. 3 is a flow diagram of a method for processing language input in a data processing system according to the invention.

FIG. 3 is a flow diagram of a method for processing language input in a data processing system according to the invention. The method starts with the step of receiving first input comprising voice input 300. The method proceeds to determine a first plurality of word candidates according to the first input 302. The method continues to the step of receiving second input comprising non-voice input 304. Finally, the method determines one or more word candidates according to the first input and the second input 306.

The speech recognition system converts the acoustic signal into a digital sequence of vectors which are matched to potential phonemes given their context. Further, the phonetic forms are matched against a lexicon and language model to create an N-best list of words for each discrete utterance. In continuous speech recognition there may not be clear pauses between words, so the recognition output may be one or more likely phrase or sentence interpretations. By default the most likely interpretation is shown in the application's current input field at the text insertion point.

Following the steps of the method, the user then determines that some of the previously recognized words are incorrect. Using a stylus, arrow keys, or voice command, the user selects one or more words for correction. The input system may display a list of most likely interpretations at this point, but it will not always show the desired word or words especially if there are display constraints.

Using the available or preferred alternate modality, such as T9 Text Input on a phone keypad, the user begins to retype the first highlighted word. Because the letters mapped to each key, such as A B C on the 2 key, are typically not acoustically similar, the system is able to immediately determine that the first phoneme, such as a plosive /b/ or /p/, is in fact a B rather than a P because the 2 key was pressed rather than the 7 key containing P Q R S. Similarly, tapping the auto-correcting QWERTY keyboard in the V B N neighborhood rather than in the I O P neighborhood increases the likelihood that the B was desired. Similarly, making a pen gesture that a handwriting recognition engine interprets as closer to a B or 3 than a P or R mutually resolves the ambiguity in both recognizers.

As the user continues to rewrite the incorrect word or words, a system implementing one embodiment of the method will immediately offer better interpretations of the original recognizer output given each ambiguous correction. As indicated in the examples above, re-entering only the first letter or two may be sufficient for the system to mutually disambiguate the entire word and offer the desired word as the best choice. The context and grammar of the preceding and/or following words in the input field, which were not selected for correction and thus may be presumed to be correct, may further prioritize and refine the interpretations of the utterance being corrected by the user. Given the most likely word reinterpretation of the current utterance, subsequent utterances, associated e.g. by phoneme tag with other words selected for correction, may be reinterpreted as other more likely words. In another embodiment, the other selected words are mapped back to phonemes, using the lexicon or using language-specific rules that that specify a pronunciation for each letter, before reinterpretation as other more likely words.

In one embodiment, the method has the vectors or phoneme tags and the ambiguous correction input directed back to the speech recognition system for a refined hypothesis search. In another embodiment, the method requires the disambiguation system to use the vectors or phoneme tags to refine and filter the correction so that only ambiguous interpretations with characters compatible with the vectors or phonemes are considered.

As the user corrects the words, the speech recognition system may determine that its segmentation of continuous speech was in error and reinterprets the boundaries between words in light of the user's corrections; or that a pause is less likely to have represented a delimiter between words and so reinterprets the utterance and displays it as a single word.

If the input options are limited on the device, the user may be able to select only one word at a time for correction. In that case, after the user selects the corrected word the method may include the step of reconsidering the following word in light of the corrected word context and/or how the original vectors map to the end of the corrected word and the beginning of the following word. The system may indicate that the following word has a lower confidence score or may automatically display the list of interpretations for the associated utterance.

In one embodiment of the invention, the system automatically interprets ambiguous input following a recognized utterance as a correction of the preceding word or phrase. In another embodiment, the system simultaneously interprets the input as a correction to a preceding word and as the start of a new word to be added to the text; by the time the user completes entry of the word, few valid corrections or new word interpretations may remain and the most likely will be offered.

In an alternate embodiment of the invention, the first and second inputs are nearly simultaneous or overlapping; in effect, the user is voicing what he or she is typing. The system automatically interprets both inputs and mutually disambiguates them to produce the best interpretation of both. The user doesn't need to go back and correct words or phrases very often since combining the two inputs increases the likelihood that the system chooses the correct interpretation. Entering only a few ambiguous inputs representing the beginning of each word may be sufficient in many cases. In another embodiment of the invention, the two inputs are concurrently entered, recognized, and mutually disambiguated only after a word or phrase is selected for correction.

For instance, a user can press the 2 key for 'a' and speak a word that starts with 'a'. In one embodiment, the key press could be taken to represent the first letter of the intended word. Thus, when both forms of input seem to agree, one form of input could reinforce the other and increase the system's confidence of the words that it presents. However, the two forms of input could disagree. In that case, words matching both forms of input could be presented in the word candidate list. The user would then be able to further clarify using either mode or both.

In addition, one form of input could be used to "build around" words from the other. For example, the user can speak the word "home" then press the 9 key shortly thereafter. Since these seem to conflict, the list of word possibilities should include words that are phonetically like "home" but also start with the letters 'w', 'x', 'y', or 'z', which appear on the 9 key. The press of the 9 key could also be considered as the start of the next part of the compound word so that when the user says 'work' the press of the 9 key can be used to help disambiguate the next spoken input.

Figure 4:
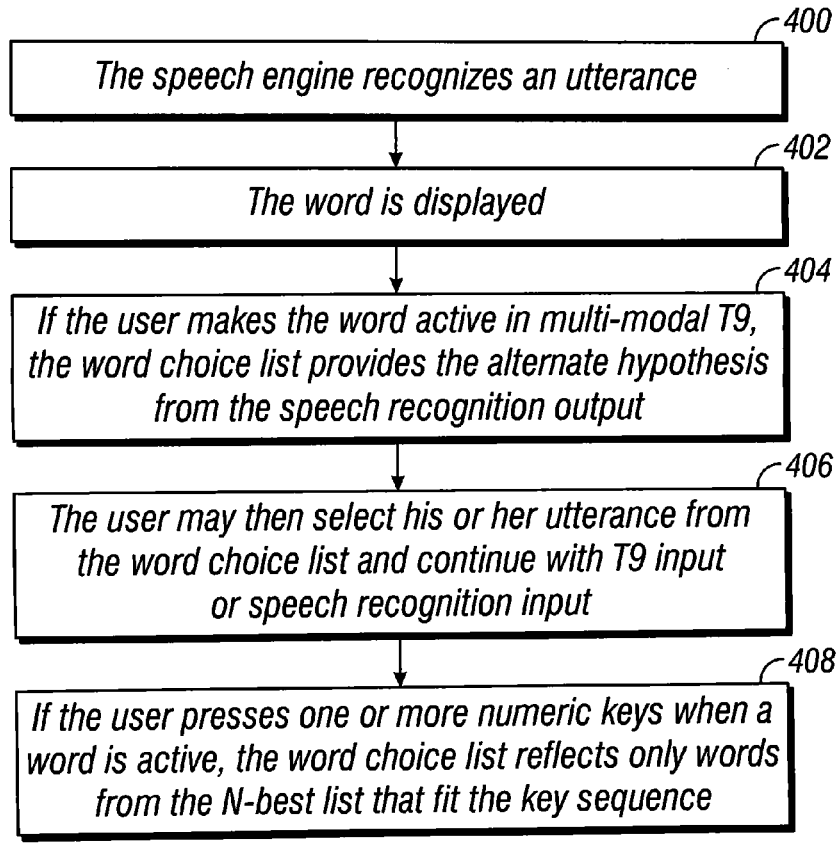
FIG. 4 is a block diagram that provides an example where a user has dictated a word according to one embodiment of the invention.

FIG. 4 is a block diagram illustrating an example where a user has dictated a word according to one embodiment of the invention. The speech engine recognizes an utterance 400. The word is displayed to the user 402. If the user reselects the word or words in the application's input field, the word choice list provides the alternate hypotheses from the speech recognition output 404. The user may then select the correct interpretation from the word choice list and continue with speech recognition input 406. If the user presses one or more ambiguous keys when a word is active, the word choice list reflects only words from the N-best list that fit the key sequence 408.

Figure 5A:
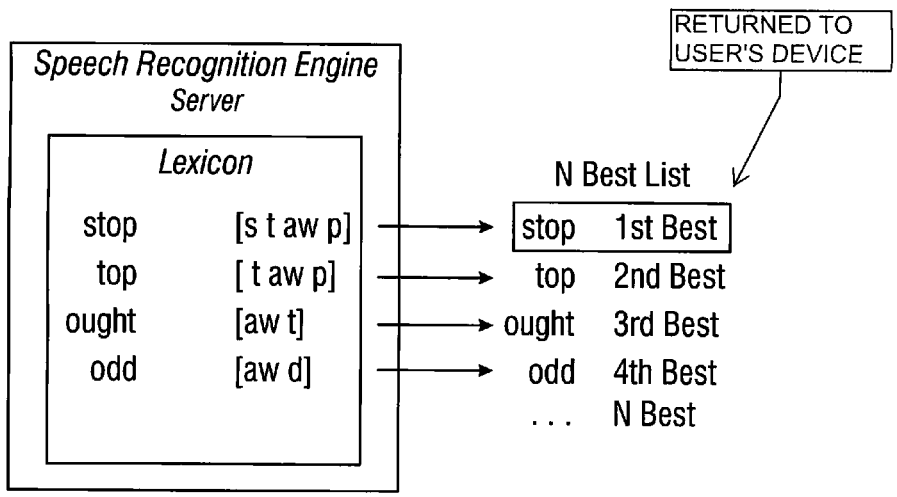
FIGS. 5A-5C are block diagrams that provide an example where a user has dictated a word according to one embodiment of the invention.
Figure 5B:
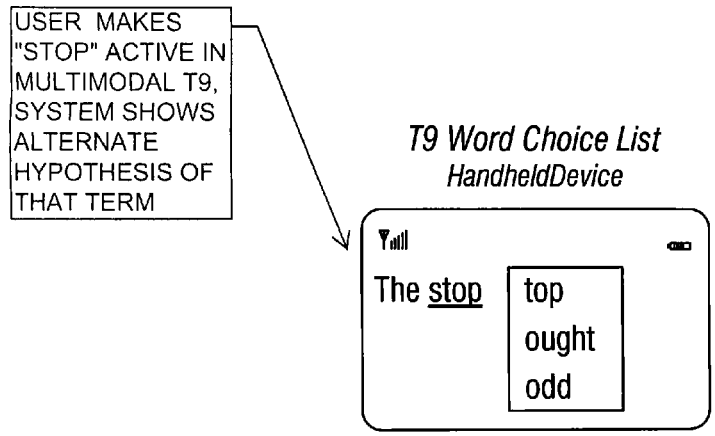
Figure 5C:
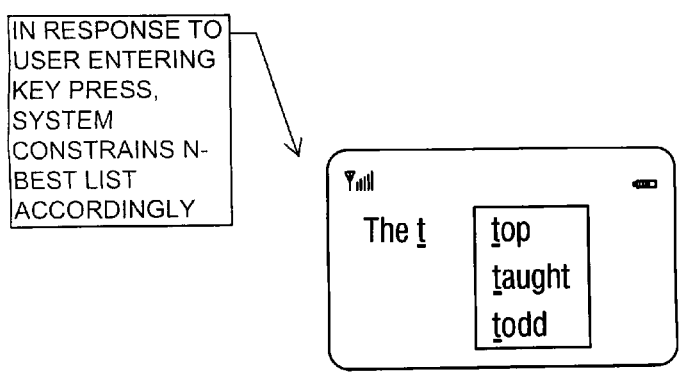

FIG. 5A-5C are diagrams and sample displays illustrating an example where a user has dictated the words "The top" according to one embodiment of the invention. The speech engine recognizes the utterance as "The stop" which is returned to the user's mobile device (FIG. 5A). If the user makes the word "stop" active in multi-modal T9, the word choice list provides the alternate hypotheses from the speech recognition output (FIG. 5B). The user may then select his utterance from the word choice list and continue with T9 input or speech recognition input.

If the user enters a key press the word choice list displays words from the N-best list that are constrained by this key press (FIG. 5C). When a word is active, an additional key press extends the letter sequence. Thus, a soft key "Edit" option may invoke the correction method.

It quickly becomes evident that the invention works as well with reduced keyboards or recognizers for languages written with ideographic characters. For example, correcting the utterance "bing", incorrectly recognized as "ping", with Pinyin letters mapped to each key, such as A B C on the 2 key; after pressing the 2 key, the system is able to immediately determine that the first phoneme is in fact a B rather than a P. Similarly, with a stroke-order input system, after the user presses a correcting key representing the first stroke category for the desired character, the speech recognition engine would be able to consider characters beginning with a stroke in another category and would be able to offer a better interpretation of the utterance. Similarly, beginning to draw the first character using a handwritten ideographic character recognition engine can correct the speech interpretation.

Though an ambiguous stroke-order entry system or a handwriting recognition engine may not be able to determine definitively which handwritten stroke was intended, the combination of the acoustic interpretation and the stroke interpretation sufficiently disambiguates the two modalities of input to offer the user the intended character. And as noted previously for alphabetic language speech input correction, after the user selects the corrected ideographic character the method may include the step of reconsidering the following character in light of the corrected context and/or how the original acoustic vectors map to the end of the corrected character and the beginning of the following character. Due to the corrections, the speech recognition system may also determine that a momentary pause is less likely to have represented a delimiter between words or phrases, and so reinterprets the utterance and displays it as a series of characters representing a single word or phrase instead of two separate words or phrases; or vice-versa.

The combination of speech recognition and ambiguous entry has other benefits. In a noisy environment, such as on a city sidewalk, in a busy cafeteria, or on a construction site, for example, the speech recognition accuracy may fall below a level acceptable to the user. Or, in a quiet environment, such as in a library or during a meeting, or when the subject matter is private or sensitive, it may be unacceptable to use speech dictation. The user then has the ambiguous input system as a fallback for free text entry. In addition, it is challenging to recognize or spell out a word that the speech recognition system doesn't have in its vocabulary, whereas the ambiguous input system typically offers a reliable means to type any character sequence and add it to its vocabulary. In addition, the speech recognition engine may be used to select a word from the list of candidates displayed by the ambiguous input system.

In one embodiment of the invention, the word or phrase interpretations are ordered relative to the frequency of those words or phrases in common use of the language. In one embodiment of the invention, the ordering is adapted, continuously or on occasion, to the user's frequency and/or recency of use of each word or phrase relative to the others.

In one embodiment of the invention, word completions or predictions that match the keystrokes or stylus taps entered thus far are offered along with the other word interpretations, to make retyping of corrections and additional words faster and easier. In one embodiment of the invention, diacritics such as vowel accents are placed on the proper characters of the word being spoken or corrected without the user indicating that a diacritic mark is needed.

In one embodiment of the invention, some or all of the inputs from the alternative modality are not ambiguous. This may reduce or remove the need for the disambiguation engine 115 in FIG. 1 but still requires the multimodal disambiguation engine 117 to reinterpret the vectors or phoneme tags of the word or phrase being corrected in light of the new input sequence entered thus far.

In one embodiment of the invention, such as when the ambiguous input system is an auto-correcting keyboard displayed on a touch-screen device, each character that is the best interpretation of the user's input during correction or retyping, such as the closest character to each stylus tap, forms a sequence that the system displays as an unambiguous interpretation, which the user may select if the desired word is not in the vocabulary.

In one embodiment of the invention, such as when the ambiguous input system is utilizing a reduced keyboard such as a standard phone keypad, the unambiguous interpretation is a two-key or multi-tap interpretation of the key sequence.

In one embodiment of the invention, the unambiguous interpretation is added to the vocabulary if the user selects it for correction or output. In one embodiment of the invention, the recognized or corrected word or unambiguous interpretation identifies a replacement word or phrase for output, such as an abbreviation for a longer phrase or an acceptable substitute for a term of profanity. In one embodiment of the invention, the system adapts to systematic differences between the user's input, e.g. tap location or slant of the handwritten shape, and the intended characters or words, based on the subsequent word or phrase interpretations actually selected by the user.

In one embodiment of the invention, the user invokes a mode in which the utterances are recognized as discrete characters, e.g., a letter, digit, or punctuation symbol. The character sequence may be added to the vocabulary if it is novel. In one embodiment of the invention, alternate words for spelling, e.g. "Alpha Tango Charlie" or "A as in Andy, P as in Paul", are recognized as discrete characters.

In one embodiment of the invention, the system may choose to disregard the vectors or phonetic tags when they no longer provide useful guidance for reinterpretation or disambiguation. In one embodiment of the invention, the system provides a means, e.g. a key or gesture, for the user to dismiss some or all of the acoustic data associated with the recognized words.

In another embodiment, during the installation phase, or continuously upon the receipt of text messages or other data, information files are scanned for words to be added to the lexicon. Methods for scanning such information files are known in the art. As new words are found during scanning, they are added to a vocabulary module as low frequency words and, as such, are placed at the end of the word lists with which the words are associated. Depending on the number of times that a given new word is detected during a scan, it is assigned a higher priority, by promoting it within its associated list, thus increasing the likelihood of the word appearing in the word selection list during information entry. Standard pronunciation rules for the current or determined language may be applied to novel words in order to arrive at their phonetic form for future recognition.

Those skilled in the art will also recognize that additional vocabulary modules (whether by rule or specified in a lexicon) can be enabled within the computer, for example vocabulary modules containing legal terms, medical terms, and other languages. Further, in some languages, such as Indic languages, the vocabulary module may employ templates of valid sub-word sequences to determine which word component candidates are possible or likely given the preceding inputs and the word candidates being considered. Via a system menu, the user can configure the system to cause the additional vocabulary words to appear first or last in the list of possible words, e.g. with special coloration or highlighting, or the system may automatically switch the order of the words based on which vocabulary module supplied the immediately preceding selected word(s). Consequently, within the scope of the appended claims, it will be appreciated that the invention can be practiced otherwise than as specifically described herein.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A computer-implemented method for processing language input in a system that includes a mobile computer, the mobile computer including a microphone and a display and a text input device operable by a user, the method comprising operations of:
   (a) responsive to the mobile computing device receiving via the microphone voice input comprising multiple discrete utterances from a user, converting the voice input into a digital sequence of vectors;
   (b) the mobile computing device creating an initial N-best list of words corresponding to each of the utterances by conducting speech recognition operations including matching the vectors to potential phonemes and matching the phonemes against a lexicon model and a language model, the operation of creating each initial N-best list of words further considering context of the corresponding utterance with respect to words of N-best lists corresponding to others of the received utterances, said context including subject-verb agreement, proper case, proper gender, and numerical agreement;
   (c) for each of said utterances, the mobile computing device visually displaying a best word from the initial N-best list of words corresponding to said utterance;
   (d) responsive to implied or explicit user selection of one of the displayed best words, said selected word being from a given N-best list of words corresponding to a given utterance, the mobile computing device causing the display to present additional words from the given initial N-best list of words;
   (e) during said presentation of the additional words, the mobile computing device receiving via the text input device hand-entered input from a user, and responsive to said text input, constraining said presentation of the additional words to exclude words of the given initial N-best list that are inconsistent with the textual input;
   (f) responsive to said presentation of the additional words being constrained to a resultant word, displaying the resultant word instead of the selected word;
   (g) the mobile computing device updating the initial N-best lists of others of the utterances besides the given utterance to provide subject-verb agreement, employ proper case, use proper gender, and exhibit numerical agreement when considered in context of the resultant word;
   (h) for each of the utterances having an updated N-best list, the mobile computing device causing the display to present a best word of the updated N-best list of words for that utterance; and (i) for each of the utterances without an updated N-best list, the mobile computing device causing the display to present a best word of the initial N-best list of words for said utterance.

2. The method of claim 1,
where the operations further include, in parallel with the operation (e), the mobile computing device interpreting the text input as user entry of a new word for entry immediately after the selected word; and responsive to the user completing entry of the new word before the presentation of additional words is constrained to a resultant word, instead of operations (f), (g), (h), and (i), the mobile computing device causing the display to present the new word following the selected word.

3. The method of claim 1, where operation (f) further comprises:
responsive to the text input starting with a letter or letters that conflict with all of the additional words, instead of constraining the presentation of additional words and completing operations (g) and (h) and (i), expanding the additional words to include words that phonetically resemble the best word of the initial N-best list but begin with said starting letter or letters.

4. The method of claim 1, where the operation of constraining said presentation of the additional words to exclude words of the given initial N-best list that are inconsistent with the textual input comprises:
the mobile computing device excluding words of the given initial N-best list that are not partially or completely spelled-out by the textual input.

5. A system for processing language input, comprising:
a mobile computer including a microphone and a display and a text input device operable by a user;
where the mobile computer is programmed to perform computer-implemented operations comprising:
(a) responsive to the mobile computing device receiving via the microphone voice input comprising multiple discrete utterances from a user, converting the voice input into a digital sequence of vectors;
(b) creating an initial N-best list of words corresponding to each of the utterances by conducting speech recognition operations including matching the vectors to potential phonemes and matching the phonemes against a lexicon model and a language model, the operation of creating each initial N-best list of words further considering context of the corresponding utterance with respect to words of N-best lists corresponding to others of the received utterances, said context including subject-verb agreement, proper case, proper gender, and numerical agreement;
(c) for each of said utterances, the mobile computing device visually displaying a best word from the initial N-best list of words corresponding to said utterance;
(d) responsive to implied or explicit user selection of one of the displayed best words, said selected word being from a given N-best list of words corresponding to a given utterance, causing the display to present additional words from the given initial N-best list of words;
(e) during said presentation of the additional words, the mobile computing device receiving via the text input device hand-entered input from a user, and responsive to said text input, constraining said presentation of the additional words to exclude words of the given initial N-best list that are inconsistent with the textual input;
(f) responsive to said presentation of the additional words being constrained to a resultant word, displaying the resultant word instead of the selected word;
(g) responsive to the operation (f), the mobile computing device updating the initial N-best lists of others of the utterances besides the given utterance to provide subject-verb agreement, employ proper case, use proper gender, and exhibit numerical agreement when considered in context of the resultant word;
(h) for each of the utterances having an updated N-best list, the mobile computing device causing the display to present a best word of the updated N-best list of words for that utterance; and
i) for each of the utterances without an updated N-best list, the mobile computing device causing the display to present a best word of the initial N-best list of words for said utterance.

6. The system of claim 5, where the operations further include, in parallel with the operation (e), interpreting the text input as user entry of a new word for entry immediately after the selected word; and
responsive to the user completing entry of the new word before the presentation of additional words is constrained to a resultant word, instead of operations (g), (h), (i), and (j), causing the display to present the new word following the selected word.

7. The system of claim 5, where operation (f) further comprises:
responsive to the text input starting with a letter or letters that conflict with all of the additional words, instead of constraining the presentation of additional words and completing operations (g) and (h) and (i), expanding the additional words to include words that phonetically resemble the best word of the initial N-best list but begin with said starting letter or letters.

8. The system of claim 5, where the operation of constraining said presentation of the additional words to exclude words of the given initial N-best list that are inconsistent with the textual input comprises:
excluding words of the given initial N-best list that are not partially or completely spelled-out by the textual input.

* * * * *